United States Patent

[11] 3,607,855

| [72] | Inventors | Hans-Georg Trieschmann<br>Hambach;<br>Gerhard Zeitler, Hessheim, both of<br>Germany |
|---|---|---|
| [21] | Appl. No. | 762,314 |
| [22] | Filed | Sept. 16, 1968 |
| [45] | Patented | Sept. 21, 1971 |
| [73] | Assignee | Badische Anilin- & Soda-Fabrik<br>Aktiengesellschaft<br>Ludwigshafen am Rhine, Rhineland-Pfalz,<br>Germany |
| [32] | Priority | Sept. 16, 1967 |
| [33] | | Germany |
| [31] | | P 17 20 302 |

[54] CONTINUOUS PRODUCTION OF CHLORINATED POLYOLEFINS
9 Claims, No Drawings

[52] U.S. Cl. ................................................. 260/94.9 H,
260/88.2, 260/93.7
[51] Int. Cl. ........................................................ C08f 27/03
[50] Field of Search ............................................ 260/94.9 H

[56] References Cited
UNITED STATES PATENTS

| 3,005,812 | 10/1961 | Wohlers .................... | 260/94.9 |
| 3,355,519 | 11/1967 | Miller et al. ............... | 260/897 |
| 3,192,188 | 6/1965 | Orthner et al. ............. | 260/88.2 |

*Primary Examiner*—Joseph L. Schofer
*Assistant Examiner*—R. A. Gaither
*Attorney*—Johnston, Root, O'Keeffe, Keil, Thompson & Shurtleff ABSTRACT: A continuous process for the chlorination of polyolefins in the presence of chlorohydrocarbons.

CONTINUOUS PRODUCTION OF CHLORINATED POLYOLEFINS

This invention relates to a continuous process for the production of chlorinated polyolefins in which the polyolefins are treated with chlorine in the presence of chlorohydrocarbons.

Methods of chlorinating polyolefins are known in which particulate polyolefins are treated in chlorohydrocarbons with chlorine. It has been found that with increasing chlorination the polyolefins pass into solution and can be separated from the solution. It has been discovered that when the prior art methods are carried out continuously difficulties are encountered, in particular too much power is required for the individual reaction steps, particularly for separating the reaction mixture.

The object of the invention is to provide a simple continuous process for chlorinating polyolefines in which the plurality of reaction steps are combined in two operations each with low power consumption. This object is achieved in a process wherein particulate polyolefin, a chlorohydrocarbon and chlorine are continuously passed into a reaction zone which contains a reaction mixture of polyolefin, chlorinated polyolefin which is partly dissolved in the chlorohydrocarbon and chlorine, a solution of chlorinated polyolefin and chlorine in the chlorohydrocarbon is withdrawn from the reaction zone at a rate corresponding to that at which the polyolefin and chlorohydrocarbon are continuously introduced, chlorine and some of the chlorohydrocarbon are distilled off from the solution and the solution is introduced into boiling water, the chlorohydrocarbon is distilled off and then the aqueous phase is separated from the chlorinated polyolefin.

Ethylene homopolymers, ethylene copolymers, propylene homopolymers and propylene copolymers are particularly suitable polyolefins which can be chlorinated by the process according to this invention. The copolymers may also contain small amounts, for example up to 10 percent by weight, of units of other ethylenically unsaturated hydrocarbons. The polyolefins may be in coarsely powdered form or in the form of granules, the particles generally having a diameter of from 100 to 5000, preferably from 500 to 2000, microns.

The process is particularly suitable for chlorinating high-density polyethylene having a molecular weight of more than 250,000 and a density of from 0.93 to 0.965, low density polyethylene having a molecular weight of from 10,000 to 180,000 and a density of from 0.91 to 0.935, and polypropylene having a molecular weight of more than 200,000 and a density of from 0.85 to 0.94.

The polyolefins are chlorinated in the presence of chlorohydrocarbons, of which low boiling point chlorohydrocarbons whose boiling points advantageously lie within the range from 30° to 90° C. are particularly suitable. Carbon tetrachloride, chloroform and trichloroethane are preferred.

The reaction zone contains from 4 to 20 parts by weight of chlorohydrocarbon per part by weight of polyolefin. 20 to 80 parts of chlorine per hour is introduced continuously into the reaction zone per 100 parts of polyolefin. The amount introduced depends on the desired degree of chlorination of the polyolefin. Polyolefin, chlorine and chlorohydrocarbon may be introduced separately into the reaction zone. It is however also possible to prepare a suspension of polyolefin in the chlorohydrocarbon first, and to introduce this suspension into the reaction zone separately from the chlorine. By using this method an agglomeration of polyolefin particles during introduction into the reaction zone is avoided.

Chlorination is carried out at a temperature of from 40° to 120° C. at pressures of from 0.2 to 4 atmospheres gauge. It is preferably carried out at the boiling point under the pressure conditions chosen. In this way the heat of reaction liberated can be removed by evaporative cooling. By using an appropriate pressure and an appropriate chlorohydrocarbon it is possible to choose the boiling point in the reaction zone so that it corresponds to the temperature of the boiling water into which a portion of the reaction solution is introduced after the chlorine has been separated. This method offers a special advantage because the reaction solution is kept at the same temperature throughout the course of operation.

There is removed from the reaction zone an amount of the solution of chlorinated polyolefin, chlorine and chlorohydrocarbon which corresponds to the amount of polyolefin, chlorohydrocarbon and chlorine continuously introduced. The amount of reaction material to be introduced and discharged per hour is about one to one-sixth part of the volume of the reaction zone. The solution may be discharged for example through a filter. It is also possible to transfer a portion of the reaction mixture to a settling zone from which the solution is aspirated after undissolved constituents have settled.

In a further operation the solution containing substantially chlorinated polyolefin and chlorine is passed into a zone in which the major portion of the chlorine and some of the chlorohydrocarbon are separated from the solution. Generally from 5 percent to 10 percent by weight of chlorohydrocarbon is separated from the solution together with the chlorine by distillation. Thus the reaction solution is advantageously introduced into a zone of subatmospheric pressure so that it is not necessary to heat the solution in order to separate the chlorine and chlorohydrocarbon. It is particularly advantageous to work at 0.5 atmosphere below the pressure in the reaction chamber.

The solution is then introduced into boiling water while stirring. By varying the pressure conditions the boiling point may be adjusted within certain limits. The boiling point of the water should be higher than the boiling point of the solvent used. It is advantageous for the boiling point to be chosen so that it is not above the softening point of the chlorinated polyolefin. Thus for example in the case of chlorinated low-density polyethylene a range of from 40° to 80° C. may be used; in the case of chlorinated high-density polyethylene and chlorinated polypropylene the temperatures chosen are within the range from 70° to 120° C. The ratio of solution to water in the separating zone is advantageously from 1:1 to 1:20. The boiling solvent is discharged together with the boiling water from this separating zone, then separated from the water and returned to the reaction zone.

The process has a low power consumption because dissolving and chlorinating proceed simultaneously. It has been found that a particularly high space-time yield is achieved in the process.

The invention is illustrated by the following Examples in which parts and percentages are by weight.

EXAMPLE 1

100 parts of powdered polypropylene having an average particle diameter of 1500 microns, a molecular weight of about 800,000, is suspended in 1200 parts of carbon tetrachloride. 100 parts of this suspension is introduced per hour into a stirred vessel filled to 60 percent of its capacity with reaction mixture. The amount contained in the reaction vessel is about 180 parts. 40 parts per hour of gaseous chlorine is introduced per 100 parts of polypropylene at a temperature of 60° C. 101.7 parts per hour of the solution is continuously withdrawn from the reaction mixture via a screen. At the same temperature 5 parts of solvent and chlorine are distilled off. The remaining solution is stirred into 400 parts of boiling water with vigorous stirring. The solvent together with the water is distilled off from the separating zone at a temperature of 100° C. A suspension of particulate chlorinated polypropylene in water is formed. 9 parts of chlorinated polypropylene having a chlorine content of 22 percent is isolated from the mixture. The mean residence time of the reaction mixture in the reaction zone is about 1.8 hours.

EXAMPLE 2

75 parts of a suspension of 1600 parts of carbon tetrachloride and 100 parts of low density polyethylene having a molecular weight of 120,000 and a density of 0.918 is introduced per hour continuously into a reaction vessel in the manner described in Example 1. The reaction vessel contains 180 parts of a reaction mixture. 64 parts per hour of gaseous chlorine is introduced per 100 parts of polyethylene at a temperature of 77° C. At a residence time of about 2.4 hours, chlorinated polyethylene containing 32 percent of chlorine is obtained. 764 parts per hour of solution is withdrawn from the reaction vessel and introduced into boiling water at a temperature of 60° C. 5.8 parts of chlorinated polyethylene is obtained after separation.

EXAMPLE 3

The procedure of Example 2 is followed under the same conditions and concentration but with a low pressure polyethylene having a molecular weight of 280,000 and a density of 0.950. A chlorinated low pressure polyethylene having a chlorine content of 18 percent is obtained.

We claim:

1. A continuous process for the production of chlorinated high density polyethylene by the action of chlorine on a high density polyethylene in the presence of a chlorohydrocarbon, wherein a particulate high density polyethylene, having a particle diameter of from 100 to 5,000 microns, a chlorohydrocarbon and chlorine are continuously introduced into a reaction zone which contains a reaction mixture of particulate polyethylene, chlorinated polyethylene which is partly dissolved in the chlorohydrocarbon and chlorine, a solution of chlorinated polyethylene and chlorine in the chlorohydrocarbon is withdrawn from the reaction zone at a rate corresponding to that at which the polyethylene and chlorohydrocarbon are continuously introduced, chlorine and some of the chlorohydrocarbon are distilled off from the solution and the solution is introduced into boiling water, the chlorohydrocarbon is distilled off and then the aqueous phase is separated from the chlorinated polyethylene.

2. A process as claimed in claim 1 wherein the polyethylene particles have a diameter of from 500 to 2000 microns.

3. A process as claimed in claim 1 wherein high-density polyethylene having a molecular weight of more than 250,000 and a density of from 0.93 to 0.965 is chlorinated.

4. A process as claimed in claim 1 wherein low-density polyethylene having a molecular weight of from 10,000 to 180,000 and a density of from 0.91 to 0.935 is chlorinated.

5. A process as claimed in claim 1 wherein the reaction medium contains 4 to 20 parts of chlorohydrocarbon per part of polyethylene.

6. A process as claimed in claim 1 wherein 20 to 80 parts of chlorine per hour is introduced into the solution per 100 parts of polyethylene.

7. A process as claimed in claim 1 wherein chlorination is carried out at the boiling point of the chlorohydrocarbon.

8. A process as claimed in claim 1 wherein carbon tetrachloride is used as the chlorohydrocarbon.

9. A process as claimed in claim 1 wherein the solution of chlorinated polyethylene is introduced into boiling water at subatmospheric pressure.